United States Patent Office 3,031,346
Patented Apr. 24, 1962

3,031,346
FLUX COATED SILVER BRAZING ELEMENT
AND FLUX COMPOSITIONS THEREFOR
Rene D. Wasserman, Stamford, Conn., and Joseph F. Quaas, Island Park, N.Y., assignors to Eutectic Welding Alloys Corporation, Flushing, N.Y., a corporation of New York
No Drawing. Filed July 25, 1960, Ser. No. 44,837
8 Claims. (Cl. 148—26)

This invention relates generally to brazing flux compositions having a low temperature fusing point of about 900°–1600° F. to thereby be adapted for use in brazing with silver base filler alloys which melt between 1100°–1800° F. as distinguished from filler alloys which melt at higher temperatures. More particularly, this invention relates to compositions of such sort which are further adapted to form a dry, tenacious, stable concretion-like sheath or coating upon a rod or other brazing element formed of silver base filler alloy or a like low temperature brazing alloy.

In conventional silver brazing, the source of filler alloy and the flux are provided by, respectively, a rod-like core of the alloy and a paste formed of the flux and kept separate from the core. Where the paste and the alloy element are so separated from each other, the following steps are necessary in order to form a silver brazed joint between two pieces of parent material.

First, since ordinary flux pastes tend to be unstable with separating out of their components, the flux paste must be stirred before use. It is then applied with a brush to both sides of the surface to be brazed. A preliminary heating is then employed to drive off the water from the flux paste and render it molten thus enabling the flux to dissolve any surface impurities. The actual brazing operation follows to form the joint between the pieces of parent material.

The procedure just described is time consuming and, therefore, expensive for that reason as well as for the reason that it requires separate inventories of flux paste and of filler alloy cores. Furthermore, since the flux compositions are heterogeneous and tend to separate out, there exists the expense in maintaining a fresh supply of flux paste.

Attempts have been made to obviate these disadvantages by coating the core wire or rod with ordinary flux formulations and thus eliminate the time consuming and expensive steps of stirring the paste, brushing it on the surfaces to be bonded and heating initially. However, those attempts have not been successful in the case of low temperature flux compositions such as used in silver brazing since all previously known low temperature flux compositons have been unstable and were easily wiped off the wire or would merely crumble and fall off. Moreover, the prior art molten flux did not provide adequate fluidity and wettability of the filler alloy to the parent material.

It is an object of this invention to provide a low temperature flux formulation melting in the range of 900°–1600° F. which is suitable for use with brazing filler alloys melting in the temperature range 1100°–1800° F. and which is stable and possesses other desirable properties.

It is a further object of this invention to provide a low temperature flux formulation of the above described character which can be prepared in a dry form or as a paste, slurry or dispersion.

It is another object of this invention to provide brazing elements formed of filler alloy melting within the temperature range of 1100°–1800° F. and coated with a compatible, low temperature stable flux composition possessing structural strength and adequate wettability and fluidity.

These and other objects are realized according to the invention in the following manner. We have discovered that, by incorporating in a low temperature flux composition suitable for silver brazing, an appropriate amount of potassium acid fluoride, other alkali metal fluorides and, also, alkali metal or alkaline earth metal chlorides, there takes place an exothermic chemical reaction whereby the composition is transformed into a substance which we believe to be of collodial character and which, in any event, has many of the properties ordinarily associated with colloidal substances. One of the effects of the acquisition of this collodial character by the flux composition is to produce a flux material having a clay-like consistency whereby the material has body, slip and flow characteristics suitable to enable it to be extruded about a brazing element and thereafter to be dehydrated to form a dry, tenacious concretion-like coating on the element.

Another effect of the acquiring of the mentioned colloidal character by the flux material is to stabilize the physical state thereof so as to preclude re-crystallization of the flux material.

The mentioned chemical reaction tends to have the side effect of making the flux composition unduly acidic. We have found that insofar as is necessary, such side effect can be neutralized by the addition to the composition of microcosmic salt which has the further desirable property of greatly increasing the capillary action of the molten flux. Other ingredients are added to the composition for the purposes of adjusting its melting temperature to the desired value and of adding other desired properties to the composition.

For a better understanding of the invention, reference is made to the following detailed description of the formulation, preparation, utilization and advantages of certain brazing flux compositions illustrative of the invention.

In the following examples, the proportions are given by weight.

*Example 1*

A flux is prepared from:

| | Percent |
|---|---|
| Alkali metal chlorides | 13.0 |
| Alkali metal fluorides (including potassium acid fluoride) | 40.0 |
| Boric acid | 30.0 |
| Borates of potassium, sodium and ammonium | 10.0 |
| Micro-cosmic salt | 4.0 |
| Sodium silicate | 3.0 |

*Example 2*

A flux is prepared from:

| | Percent |
|---|---|
| Chlorides of sodium, calcium, lithium and potassium | 14.0 |
| Fluorides of potassium, sodium and calcium | 25.0 |
| Potassium acid fluoride | 20.0 |
| Boric acid | 27.0 |
| Borates of potassium, sodium and ammonium | 9.0 |
| Micro-cosmic salt | 5.0 |

In Example 2, the recited chlorides are available in a weight ratio of about 6.6 to 7.8 to 27 to 36 respectively. The fluorides are represented in a weight ratio of 75 to 72 to 1.5 respectively. The borates are present in a weight ratio of 5 to 3 to 1 respectively.

The flux of this invention comprises as essential ingredients, from 5 to 20 parts by weight of alkali metal or alkaline earth metal chloride, from 30 to 45 parts by weight of alkali metal or alkaline earth metal fluorides including potassium acid fluoride, from 30 to 45 parts by weight of borates including boric acid, and from 2 to 10 parts by weight of micro-cosmic salt. As an optional ingredient the flux composition may contain from 2 to 5 parts by weight of a silicate such as sodium silicate.

As the alkali metal or alkaline earth metal chloride, we can use sodium, lithium, potassium, rubidium, cesium, barium, calcium, strontium or mixtures thereof. The presence of the chloride ingredient promotes better wettability of the flux by lowering its surface tension and thus reducing the viscosity and fluidity of the composition.

As examples of the fluoride constituent, we can use alkali or alkaline earth metal fluorides including sodium, potassium, lithium, rubidium, calcium, barium and mixtures of the foregoing. Potassium acid fluoride is always included as a fluoride ingredient, this compound exhibiting an etching effect on the parent material as well as contributing to the formation of the colloidal material.

Although we do not wish to be bound by any particular theory, we believe that some chemical reaction occurs between the fluoride and chloride constituents to form a colloidal material which imparts excellent body, slip and flow properties to the flux so that, upon completion of the mixing, the flux has a clay-like consistency as opposed to the crumbly consistency which it has at the start of the mixing. That a chemical reaction occurs is evidenced by the emission of heat which takes place when the ingredients are blended and the fact that, after completon of the mixing, the flux is not deliquescent even when the flux includes chemicals such as lithium chloride which are deliquescent before being mixed. Another reason why we believe that a colloidal material is formed is that we have found that, after the flux has been mixed to undergo its described change in physical state, the flux composition is no longer subject to crystallization with resulting separation of the ingredients into a heterogeneous composition.

The flux formulation of our invention contains about 30 to 45 parts by weight of borates which preferably include some boric acid. Alkali metal borates such as sodium or potassium may be used as well as ammonium borates and also mixtures of the foregoing. Mixtures of boric acid with borates are ingredients of many well-known fluxes and, as such, do not form the basis of our invention.

The micro-cosmic salt, specifically, hydrated sodium ammonium hydrogen phosphate ($NaNH_4HPO_4 \cdot H_2O$), plays an important part in our composition. The salt enhances the wettability of the base alloy to the parent material and tremendously increases the capillarity of the flux so that the flux flows smoothly and quickly around the joint being bonded. As another function, it contributes an ammonium radical which appears to neutralize any acidic radicals formed during the fluoride/chloride reactions which occur in the blending operation. Moreover, the salt also acts as an inhibitor of re-crystallization.

Alkali or alkaline earth metal silicates such as sodium silicate may be added in minor amounts of 2–5% by weight. These materials increase the structural strength of the coating, increase its binding power and hasten drying of the flux.

It should be obvious that as the chloride component, one could make use of mixtures of the various chlorides for purposes of economy or to vary the melting point of any formulaton. The same holds true for the fluorides and borates. Thus, if it were felt that the melting point of the flux was too low for a particular purpose, some sodium chloride could be substituted for lithium chloride to raise the melting point of the composition without altering its characteristics.

Our particular flux formulation is so designed that in its molten state it will react with and remove metal oxides and other impurities on the surfaces of the materials to be bonded as well as on the filler alloy. The molten filler alloy is chemically cleansed by the flux which also covers the melt and protects it from surface contamination by atmospheric gases such as oxygen, nitrogen, etc. The flux further lowers the surface tension of the filler alloy thereby providing fluidity and wettability of the filler alloy to the parent material.

The melting point of the flux composition is in the range of about 900° F. to 1600° F. and is specifically designed for use with silver base alloys melting within the temperature range of about 1100° to 1800° F. However, while the invention has hitherto been described in terms of silver brazing, other brazing alloys melting within the same range are also compatible with the flux. For example, copper base brazing alloys such as phosphorus-copper, bronze and brass alloys are all within the scope of our invention and may be utilized with our flux.

The flux may be prepared in dry form by blending the ingredients in any order in a mixer for about 20 minutes. The particle size of the constituents is not important, although as a practical matter a maxium size of about 50 mesh should be observed. After the exothermic reaction takes place, the material is further treated to render it a paste, a slurry, or a coating on a brazing rod.

In the preparation of a paste or slurry, one merely has to blend the dry constituents wtih an amount of water sufficient to yield a formulation having the desired consistency. Usually, about 20 to 50 parts of water and 80 to 50 parts of dry mix are blended to give the ultimate product. A dry type of paste may also to be prepared merely by dehydrating the slurry in an oven.

The slurry is particularly useful where one may wish to coat brazing elements. The brazing rods, flats, screens, or other elements can be dipped into the flux slurry to form a coating of the flux on the element. A subsequent heating operation serves to drive off excess water and harden the coating.

To prepare a flux-coated silver brazing rod by extruding around a core wire, the following procedure may be followed. First, the extrusion type flux is prepared in the usual manner by blending the dry ingredients in, for example, a Hobart type vertical mixer. Water does not have to be added since moisture is usually released by some of the ingredients, e.g., borax and/or the deliquescent chemicals (e.g., lithium chloride and calcium chloride). Mixing for about 20 minutes is sufficient to enable the exothermic reaction to be completed. The flux is now in a colloidal clay-like form and is extruded around a core wire using a rod-coating extrusion press. The so-coated core wires or rods are next baked to drive off any water and harden the coating. The rods are then ready to be used in any silver brazing operation.

Another embodiment of our invention encompasses the addition of mesh particles to the flux formulations in particle sizes of about 40 to 325 mesh. The addition of boron and/or silicon mesh to the base flux results in an improved composition since these mesh particles hasten the temperature rise in the joint area and induce faster melting of the core wire because of the improved heat conduction between the particles.

A formulator may wish to add silver alloy mesh to the basic flux composition. This results in a greater deposition of weld material since the silver mesh contributes to the molten brazing puddle. Thus, the deposition efficiency of the flux coated rod is increased since for a basic unit of welding time, there is less consumption of the brazing rod.

The proportions of mesh to flux can be widely varied. Ordinarily, however, about 5–60% by weight of mesh to about 95–40% by weight flux are utilized.

Instead of using mesh particles of silver alloy, one could use mixtures of meshes of zinc, tin, copper, etc., in suitable proportion to match the core or rod composition. Alternatively, the mesh material may be used to supplement the core or rod material so that the admixture of both in the molten state provides the desired composition for the brazing alloy.

The silver brazing flux which is the subject of our invention, provides a compatible, stable flux possessing high structural strength and superior fluidity and wettability with the ability to be utilized at lower temperatures than the brazing fluxes now available to the art. A composite product is now available to the welding industry in the form of a flux coated silver brazing element which is stable and possesses the many desirable properties set forth above.

It will occur to those skilled in the art that there are many modifications to the invention as specifically described herein. It is intended to include all such modifications within the scope of the appended claims.

We claim:

1. A low temperature brazing flux composition consisting essentially of 5–20 parts by weight of a compound selected from the group consisting of alkali metal and alkaline earth metal chlorides and mixtures thereof; 30–40 parts by weight of a compound selected from the group consisting of alkali metal and alkaline earth metal fluorides and mixtures thereof; 30–45 parts by weight of a borate/boric acid mixture where the borate is selected from the group consisting of alkali metal and ammonium borates and mixtures thereof, and 2–10 parts by weight of micro-cosmic salt.

2. A brazing flux in the form of an aqueous mix consisting essentially of 20 to 50 parts of water and 80 to 50 parts of the flux formulation recited in claim 1.

3. A low temperature silver brazing flux composition consisting essentially of the following ingredients in percent by weight: chlorides of sodium, calcium, lithium and potassium—14%; fluorides of potassium, sodium and calcium—25%; potassium acid fluoride—20%; boric acid—27%; borates of sodium, potassium and ammonium—9%; and micro-cosmic salt—5%.

4. A composition consisting essentially of a low temperature brazing flux and mesh particles intermixed therewith, the brazing flux consisting essentially of 5–20 parts by weight of a compound selected from the group consisting of alkali metal and alkaline earth metal chlorides and mixtures thereof; 30–40 parts by weight of a compound selected from the group consisting of alkali metal and alkaline earth metal fluorides and mixtures thereof; 30–45 parts by weight of a borate/boric acid mixture where the borate is selected from the group consisting of alkali metal and ammonium borates and mixtures thereof, and 2–10 parts by weight of microcosmic salt; the proportions of mesh particles to flux being in the range of from about 5–60% by weight mesh to about 95–40% by weight of the flux, the size of said mesh particles ranging from about 40 to about 325 mesh.

5. A flux formulation as in claim 4 in which the mesh is selected from the group consisting of boron and silicon.

6. A flux formulation as in claim 4 in which the mesh particles consist essentially of silver.

7. A silver brazing element in the form of a core consisting essentially of silver and a flux coating on said core, said flux coating consisting essentially of 5–20 parts by weight of a compound selected from the group consisting of alkali metal and alkaline earth metal chlorides and mixtures thereof, 30–45 parts by weight of a compound selected from the group consisting of alkali metal and alkaline earth metal fluorides and mixtures thereof, 30–45 parts by weight of a borate containing boric acid, said borate being selected from the group consisting of alkali metal and ammonium borates and mixtures thereof, and 2–10 parts by weight of micro-cosmic salt.

8. A low temperature brazing flux composition consisting essentially of 5–20 parts by weight of a compound selected from the group consisting of alkali metal and alkaline earth metal chlorides and mixtures thereof; 30–40 parts by weight of a compound selected from the group consisting of alkali metal and alkaline earth metal fluorides and mixtures thereof; 30–45 parts by weight of a borate/boric acid mixture where the borate is selected from the group consisting of alkali metal and ammonium borates and mixtures thereof; 2–10 parts by weight of microcosmic salt, and 2–5 parts by weight of a silicate selected from the group consisting of alkali metal and alkaline earth metal silicates and mixtures thereof.

References Cited in the file of this patent

UNITED STATES PATENTS

| | | |
|---|---|---|
| 1,940,262 | Lytle | Dec. 19, 1933 |
| 2,031,909 | Schweitzer | Feb. 25, 1936 |
| 2,171,041 | Michel | Aug. 29, 1939 |
| 2,322,416 | Coleman et al. | June 22, 1943 |
| 2,552,104 | Miller et al. | May 8, 1951 |
| 2,806,801 | Leston | Sept. 17, 1957 |